United States Patent [19]
Kang

[11] Patent Number: 5,650,711
[45] Date of Patent: Jul. 22, 1997

[54] APPARATUS FOR MEASURING INTERNAL PRESSURE OF BATTERY

[75] Inventor: Jae-Ho Kang, Suwon, Rep. of Korea

[73] Assignee: Samsung Display Devices Co., Ltd., Kyungki-do, Rep. of Korea

[21] Appl. No.: 576,355

[22] Filed: Dec. 21, 1995

[30] Foreign Application Priority Data

Dec. 28, 1994 [KR] Rep. of Korea .................. 94-38130

[51] Int. Cl.$^6$ ..................................... H02J 7/00
[52] U.S. Cl. ............................................ 320/46; 429/57
[58] Field of Search ........................... 320/4–6; 429/57–60

[56] References Cited

U.S. PATENT DOCUMENTS

| | | | |
|---|---|---|---|
| 3,906,330 | 9/1975 | Salamon et al. | 320/46 |
| 4,282,476 | 8/1981 | Frezzolini et al. | 320/46 |
| 4,327,157 | 4/1982 | Himy et al. | 429/61 |
| 4,499,424 | 2/1985 | Rowlette | 429/58 X |
| 4,689,544 | 8/1987 | Stadnick et al. | 320/46 |
| 5,313,061 | 5/1994 | Drew et al. | 250/281 |
| 5,346,781 | 9/1994 | Yuasa et al. | 429/59 |
| 5,396,163 | 3/1995 | Nor et al. | 320/21 |
| 5,425,374 | 6/1995 | Ueda et al. | 128/719 |
| 5,468,260 | 11/1995 | Takee et al. | 429/59 X |
| 5,488,285 | 1/1996 | Hosobuchi | 320/46 |
| 5,529,857 | 6/1996 | Nogami et al. | 429/59 |

FOREIGN PATENT DOCUMENTS

| | | |
|---|---|---|
| 3203168 | 11/1991 | Japan . |
| 4025738 | 5/1992 | Japan . |
| 6074857 | 6/1994 | Japan . |
| WO-A-94-01745 | 1/1994 | WIPO . |

Primary Examiner—Peter S. Wong
Assistant Examiner—K. Shin
Attorney, Agent, or Firm—Lowe, Price, LeBlanc & Becker

[57] ABSTRACT

An apparatus for measuring the internal pressure of a battery, including a charge/discharge unit for charging or discharging the battery, an internal pressure measuring sensor unit for measuring the internal pressure of the battery while charging or discharging the battery through the charge/discharge unit, an analog/digital converting unit for converting a sensing signal output from the internal pressure measuring sensor unit into a digital signal, a digital signal control unit for controlling the digital signal output from the A/D converting unit so that the digital signal can be applied to a computer, and the computer for recording an output signal from the digital signal control unit using a database. The apparatus can manage the data about battery's internal pressure using a data base. The apparatus also includes a gas collecting unit connected between the battery and the internal pressure measuring sensor unit and charged with argon or nitrogen gas. The gas collecting unit senses an overcharged condition of the battery as well as the internal pressure of the battery, thereby easily checking the portion of the battery (anode, cathode and electrolyte) where the gas is being generated in the overcharged condition of the battery.

3 Claims, 2 Drawing Sheets

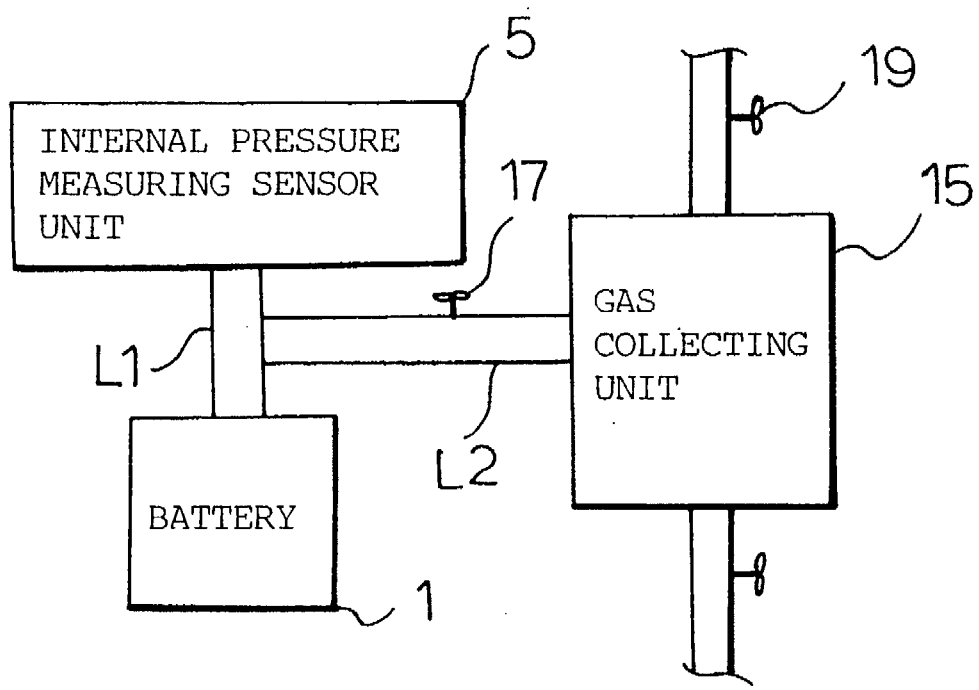

APPARATUS FOR MEASURING INTERNAL PRESSURE OF BATTERY

BACKGROUND OF THE INVENTION

1. Field of the Invention

The present invention relates to an apparatus for measuring the internal pressure of a battery, and more particularly to a battery's internal pressure measuring apparatus being capable of measuring the pressure generated in the battery while charging or discharging the battery and of collecting and analyzing gas generated inside the battery while charging or discharging the battery to check the portion of the battery (anode, cathode or electrolyte) where the gas is being generated in the overcharged condition of the battery, thereby achieving an improvement in battery performance.

2. Description of the Prior Art

FIG. 1 illustrates a conventional battery's internal pressure measuring apparatus. As shown in FIG. 1, the measuring apparatus includes a charge/discharge unit 3 for charging or discharging a battery 1, an internal pressure measuring sensor unit 5 for measuring the internal pressure of the battery 1, and a recording unit 7 for recording a sensing signal generated from the sensor unit 5. In this measuring apparatus, the internal pressure measuring sensor unit 5 measures a pressure generated inside the battery 1 while charging or discharging the battery 1 through the charge/discharge unit 3. The battery's measured internal pressure is then recorded by the recording unit 7. However, data obtained by such a recording system can not be managed using a database. Furthermore, it is troublesome to reduce, compare and analyze such data. Such data work also requires a lot of time.

SUMMARY OF THE INVENTION

Therefore, an object of the invention is to solve the above-mentioned problems and to provide an apparatus for measuring the internal pressure of a battery, being capable of converting an analog signal output from its internal pressure measuring sensor into a digital signal being manageable in a database by a computer to achieve easy data storage, analysis and reduction, and of collecting and analyzing gas generated inside the battery while charging or discharging the battery to easily check the portion of battery (anode, cathode and electrolyte) where the gas is generated in the overcharged condition of the battery, thereby immediately repairing the checked battery portion.

In accordance with the present invention, this object is accomplished by providing an apparatus for measuring the internal pressure of a battery, comprising: a charge/discharge unit for charging or discharging the battery; an internal pressure measuring sensor unit for measuring the internal pressure of the battery while charging or discharging the battery through the charge/discharge unit; an analog/digital converting unit for converting a sensing signal output from the internal pressure measuring sensor unit into a digital signal; a digital signal control unit for controlling the digital signal output from the A/D converting unit so that the digital signal can be applied to a computer; and the computer for recording an output signal from the digital signal control unit using a database.

BRIEF DESCRIPTION OF THE DRAWINGS

Other objects and aspects of the invention will become apparent from the following description of embodiments with reference to the accompanying drawings in which:

FIG. 3 is a block diagram illustrating a battery's internal pressure measuring apparatus according to another embodiment of the present invention.

DETAILED DESCRIPTION OF THE PREFERRED EMBODIMENTS

Figure 1:
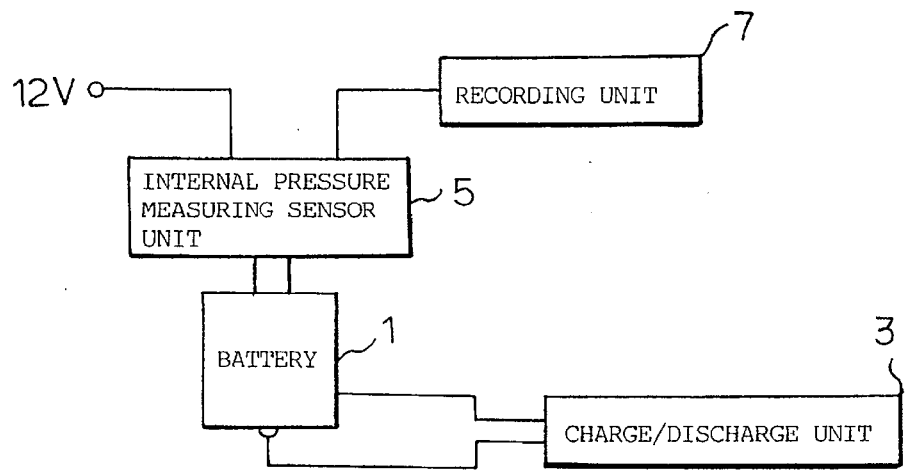
FIG. 1 is a block diagram illustrating a conventional battery's internal pressure measuring apparatus.
Figure 2:
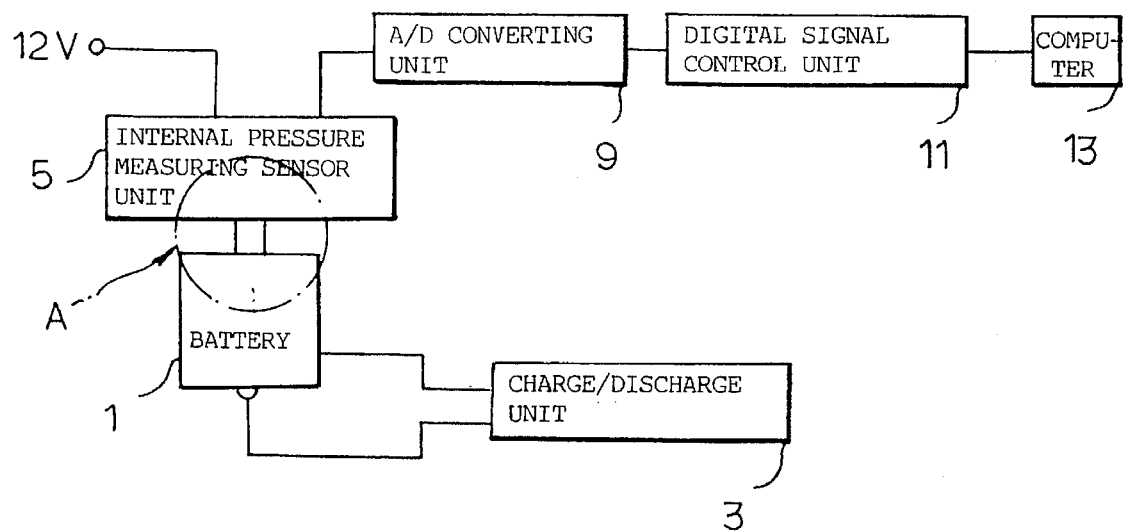
FIG. 2 is a block diagram illustrating a battery's internal pressure measuring apparatus according to an embodiment of the present invention.

FIG. 2 is a block diagram illustrating a battery's internal pressure measuring apparatus according to an embodiment of the present invention. In FIG. 2, elements respectively corresponding to those in FIG. 1 are denoted by the same reference numerals. As shown in FIG. 2, the apparatus includes a charge/discharge unit 3 for charging or discharging a battery 1 and an internal pressure measuring sensor unit 5 for measuring the internal pressure of the battery 1. In accordance with the present invention, the apparatus also includes an analog/digital (A/D) converting unit 9 coupled to the internal pressure measuring sensor unit 5. The A/D converting unit 9 serves to convert a sensing signal output from the internal pressure measuring sensor unit 5 into a digital signal capable of being read by a computer. Coupled to the A/D converting unit 9 is a digital signal control unit 11 for controlling the digital signal output from the A/D converting unit 9 so that the digital signal can be applied to a computer 13. The computer 13, which is coupled to the digital signal control unit 11, may be a personal computer which is suitable to record an output signal from the digital signal controlling unit 11 using a database.

FIG. 3 is a block diagram illustrating a battery's internal pressure measuring apparatus according to another embodiment of the present invention. This embodiment has the same construction as that of FIG. 2 except for the provision of a gas collecting unit. As shown in FIG. 3, the gas collecting unit, which is denoted by the reference numeral 15, is connected between the battery 1 and the internal pressure measuring sensor unit 5 to sense the overcharged condition of the battery 1 as well as the battery's internal pressure. In particular, the gas collecting unit 15 is connected to a line L1, which connects the battery 1 and internal pressure measuring sensor unit 5 to each other, via a line L2 connected to the line L1. On the line L2, an intermediate valve 17 is installed for opening and closing the line L2 to selectively feed the gas in the battery 1 to the gas collecting unit 15. A gas supply valve 19 is provided at the gas collecting unit 15 to charge the gas collecting unit 15 with gas.

It is preferred that the gas collecting unit 15 be charged with nitrogen or argon gas.

The operation of the battery's internal pressure measuring apparatus will now be described in conjunction with the embodiment of FIG. 3.

When the charge/discharge unit 3 charges or discharges the battery 1, pressure is generated inside the battery 1. This internal pressure of the battery 1 is sensed by the internal pressure measuring sensor unit 5 which, in turn, generates an analog signal indicative of the sensed internal pressure. The analog signal from the internal pressure measuring sensor unit 5 is sent to the A/D converter 9 which, in turn, converts the received signal into a digital signal. The computer 13 receives the digital signal from the A/D converter 9 via the digital signal control unit 11. The computer 13 processes the received data so that the data is manageable using a database.

Meanwhile, the gas collecting unit 15 is charged with argon or nitrogen gas through the gas supply valve 19 while the intermediate valve 17 installed between the battery 1 and internal pressure measuring sensor unit 5 is closed. After charging the gas collecting unit 15 with the argon or nitrogen gas, the gas supply valve 19 is closed. The intermediate valve 17 is then opened. As a result, gas generated in the battery 1 (consisting of oxygen gas generated at the anode and hydrogen gas generated at the cathode) enters the gas collecting unit 15 through the opened intermediate valve 17. Thereafter, the intermediate valve 17 is closed. In the gas collecting unit 15, the gas (oxygen and hydrogen gas) supplied from the battery 1 is mixed with the gas (argon or nitrogen gas) previously filled in the gas collecting unit 15. The mixture is then analyzed by a gas analyzing device to measure respective amounts of oxygen and hydrogen contained in the gas generated in the battery 1.

As apparent from the above description, the present invention provides an apparatus for measuring the internal pressure of a battery, capable of converting an analog signal output from its internal pressure measuring sensor into a digital signal being manageable in a database by a computer. Accordingly, the present invention provides an advantage of achieving easy data analysis and reduction. In accordance with the present invention, the measuring apparatus may also include a gas collecting unit for collecting and analyzing gas generated inside the battery while charging or discharging the battery. By the provision of the gas collecting unit, it is possible to easily check the portion of the battery (anode, cathode or electrolyte) where the gas is being generated in the overcharged condition of the battery, thereby immediately repairing the checked battery portion. Accordingly, the battery can have an improved performance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring an internal pressure of a battery, comprising:

a computer;

a charge/discharge unit for charging or discharging the battery;

an internal pressure measuring sensor unit connected to measure the internal pressure of the battery while charging or discharging thereof through the charge/discharge unit;

an analog/digital converting unit connected to convert a sensing signal output from the internal pressure measuring sensor unit into a digital signal;

a digital signal control unit for controlling the digital signal output from the A/D converting unit so that the digital signal can be transmitted to the computer; and wherein the computer is configured to record the digital output signal from the digital signal control unit using a data base.

wherein the apparatus further comprises an intermediate valve installed between the battery and the internal pressure measuring sensor unit; and a gas collecting unit connected to the intermediate valve and adapted to sense an overcharged condition of the battery, said gas collecting unit being charged with argon or nitrogen gas.

2. The apparatus of claim 1, wherein said gas collecting unit is operable to collect oxygen and hydrogen gas from the battery to thereby facilitate measurement of respective amounts of oxygen and hydrogen contained in the gas generated in said battery.

3. The apparatus of claim 1, wherein said gas collecting unit is further connected to sense internal pressure of the battery.

* * * * *